US 12,543,271 B1
United States Patent — Dautenhahn
Date of Patent: Feb. 3, 2026

(54) DUAL PUMP SYSTEM AND METHOD TO CONTROL WAVESOLDER CONTACT LENGTH

(71) Applicant: Illinois Tool Works Inc., Glenview, IL (US)

(72) Inventor: Jonathan M. Dautenhahn, Lake Ozark, MO (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/982,333

(22) Filed: Dec. 16, 2024

(51) Int. Cl.
| | |
|---|---|
| B23K 1/00 | (2006.01) |
| B23K 1/08 | (2006.01) |
| B23K 3/00 | (2006.01) |
| B23K 3/06 | (2006.01) |
| F04D 7/06 | (2006.01) |
| F04D 15/00 | (2006.01) |
| H05K 3/34 | (2006.01) |

(52) U.S. Cl.
CPC .......... H05K 3/3468 (2013.01); B23K 1/085 (2013.01); B23K 3/0653 (2013.01); F04D 7/065 (2013.01); F04D 15/0022 (2013.01)

(58) Field of Classification Search
CPC ........ H05K 3/3468; H05K 3/34; F04D 7/065; F04D 15/0022; B23K 3/0653–0676; B23K 1/085; B23K 1/0016
USPC ...... 228/179.1–180.22, 33, 37, 43, 256, 260
See application file for complete search history.

(56) References Cited

U.S. PATENT DOCUMENTS

| | | | | | |
|---|---|---|---|---|---|
| 4,886,201 | A | * | 12/1989 | Deambrosio | B23K 3/0653 228/37 |
| RE33,197 | E | * | 4/1990 | Deambrosio | B23K 3/0653 228/180.1 |
| 5,156,324 | A | * | 10/1992 | Hueste | B23K 1/085 228/180.1 |
| 10,780,516 | B2 | | 9/2020 | Dautenhahn et al. | |
| 11,389,888 | B2 | | 7/2022 | Dautenhahn | |
| 2001/0020637 | A1 | * | 9/2001 | Zen | B23K 1/085 228/42 |
| 2001/0030220 | A1 | * | 10/2001 | Willis | B23K 3/0653 228/37 |

(Continued)

FOREIGN PATENT DOCUMENTS

| | | | | |
|---|---|---|---|---|
| CN | 100584154 C | * | 1/2010 | ............... B23K 3/06 |
| CN | 103406628 A | * | 11/2013 | ......... B23K 30/0607 |

(Continued)

Primary Examiner — Kiley S Stoner
(74) Attorney, Agent, or Firm — Lando & Anastasi, LLP

(57) ABSTRACT

A wave soldering station of a wave soldering machine includes a flow duct positioned in a reservoir of a solder pot, and a core frame supported by the flow duct. The wave soldering station further includes a first pump to deliver solder material to a first chamber, a second pump to deliver solder material to a second chamber, and a wave soldering nozzle assembly supported by the core frame. The wave soldering nozzle assembly includes a solder distribution baffle to create a solder wave, and an exit wing coupled to the core frame and configured to move from a lowered position to enable increased solder flow and a raised position to decrease flow of solder material. The first pump, the second pump and the exit wing are configured to control the flow of solder through the solder distribution baffle to vary a contact length of the solder wave.

20 Claims, 10 Drawing Sheets

(56) References Cited

U.S. PATENT DOCUMENTS

| | | | | |
|---|---|---|---|---|
| 2003/0116607 A1* | 6/2003 | Wang | ................... | B23K 3/0653 |
| | | | | 228/37 |
| 2011/0226843 A1* | 9/2011 | Yanaros | ................. | B23K 1/203 |
| | | | | 228/37 |
| 2016/0052074 A1* | 2/2016 | Hueste | ................. | H05K 3/3489 |
| | | | | 228/37 |
| 2018/0111211 A1* | 4/2018 | Dautenhahn | .............. | H05K 3/34 |
| 2019/0381590 A1* | 12/2019 | Dautenhahn | ........... | B23K 1/085 |
| 2022/0048127 A1* | 2/2022 | Dautenhahn | .............. | B23K 3/08 |
| 2025/0133664 A1* | 4/2025 | Dautenhahn | ....... | H05K 13/0815 |
| 2025/0269450 A1* | 8/2025 | Dautenhahn | ........... | B23K 1/085 |

FOREIGN PATENT DOCUMENTS

| | | | | | |
|---|---|---|---|---|---|
| CN | 106925857 | A | * | 7/2017 | ................ B23K 3/08 |
| CN | 109382560 | A | * | 2/2019 | ............. B23K 1/085 |
| CN | 111527800 | A | * | 8/2020 | ............. B23K 3/08 |
| CN | 115383239 | A | * | 11/2022 | ............. B23K 1/085 |
| CN | 118417650 | A | * | 8/2024 | ............. B23K 1/085 |
| CN | 118455679 | A | * | 8/2024 | ............. B23K 1/085 |
| CN | 118559136 | A | * | 8/2024 | ............. B23K 1/085 |
| CN | 118951201 | A | * | 11/2024 | ............. B23K 3/087 |
| DE | 10150495 | A1 | * | 4/2003 | ........... B23K 3/0653 |
| EP | 3183086 | B1 | * | 12/2019 | ........... B23K 3/0653 |
| EP | 4541495 | A1 | * | 4/2025 | ............... H05K 3/34 |
| JP | 3917665 | B2 | * | 5/2007 | ........... B23K 3/0653 |
| WO | WO-0166296 | A1 | * | 9/2001 | ........... B23K 3/0653 |
| WO | WO-2008154117 | A1 | * | 12/2008 | ........... B23K 3/0653 |
| WO | WO-2010087374 | A1 | * | 8/2010 | ............ B23K 3/047 |

\* cited by examiner

DUAL PUMP SYSTEM AND METHOD TO CONTROL WAVESOLDER CONTACT LENGTH

BACKGROUND OF DISCLOSURE

1. Field of Disclosure

The present disclosure relates generally to apparatus and methods for manufacturing printed circuit boards and for assisting a process of soldering metals to integrated circuit boards, and more particularly to a wave soldering machine and related method having two pumps configured to control the flow of solder to a wave soldering nozzle assembly and an exit wing configured to control a height of a solder wave.

2. Discussion of Related Art

In the fabrication of printed circuit boards, electronic components can be mounted to a printed circuit board by a process known as "wave soldering." In a typical wave soldering machine, a printed circuit board (sometimes referred to as a "PCB") is moved by a conveyor on an inclined path past a fluxing station, a pre-heating station, and finally a wave soldering station. At the wave soldering station, a wave of solder is caused to well upwardly (by means of a pump) through a wave solder nozzle and contact portions of the printed circuit board to be soldered.

Typical wave solder nozzles have nozzles configured to control the flow of solder generated by the wave soldering machine. The process of adjusting the solder flow can be difficult and imposes risks to operators tasked with making such adjustments within a solder pot filled with molten solder. Minimizing dross created by the solder flow over the nozzle is also desired.

SUMMARY OF DISCLOSURE

One aspect of the present disclosure is directed to a wave soldering machine to perform a wave soldering operation on a printed circuit board. In one embodiment, the wave soldering machine comprises a housing and a conveyor coupled to the housing. The conveyor is configured to deliver a printed circuit board through the housing. The wave soldering machine further comprises a wave soldering station coupled to the housing and the conveyor. The wave soldering station includes a solder pot having a reservoir of solder material, a flow duct positioned in the reservoir of the solder pot, and a core frame supported by the flow duct. The core frame includes a first chamber and a second chamber. The wave soldering station further includes a first pump configured to deliver solder material to the first chamber, a second pump configured to deliver solder material to the second chamber, and a wave soldering nozzle assembly supported by the core frame. The wave soldering nozzle assembly has a solder distribution baffle configured to create a solder wave, and an exit wing coupled to the core frame and configured to move from a lowered position to enable increased solder flow and a raised position to decrease flow of solder material. The wave soldering machine further comprises a controller coupled to the wave soldering station to control the operation of the first pump and the second pump and to control the movement of the exit wing to control the flow of solder through the solder distribution baffle to vary a contact length of the solder wave.

Embodiments of the wave soldering machine further may include a first pump impeller positioned within the flow duct in the reservoir of the solder pot and a second pump impeller positioned within the flow duct in the reservoir of the solder pot. The flow of solder material within each chamber of the two chambers may be controlled by a respective pump impeller of the two pump impellers. Each pump impeller of the two pump impellers may include a centrifugal pump to pump the solder material to the wave soldering nozzle assembly. Each chamber of the two chambers may include an inlet, which is connected to a respective pump impeller. Each pump impeller of the two pump impellers may be coupled to the controller to control the flow of solder material provided by the pump impeller. The controller may control the first pump impeller to deliver solder material to a load side of the solder distribution baffle through the first chamber, and the controller may control the second pump impeller to deliver solder material to an unload side of the solder distribution baffle through the second chamber. The controller may be configured to operate the first pump impeller and to activate an exit wing actuator to move the exit wing to the lowered position to provide a minimum contact length of the solder wave and to operate the first pump impeller and the second pump impeller and to activate the exit wing actuator to move the exit wing to the raised position to provide a maximum contact length of the solder wave. The exit wing may be rotatable about a hinge with respect to the core frame to move the exit wing between the lowered position and the raised position. The wave solder nozzle assembly further may include an exit wing actuator connected to the exit wing and coupled to the controller. The exit wing actuator may be configured to adjust the position of the exit wing between the lowered position and the raised position. The exit wing actuator may be connected to the exit wing by a linkage. The linkage may include at least one rotating link having a first end rotatably coupled to an end of the exit wing and a second end that is rotatably coupled to an actuator arm of the exit wing actuator.

Another aspect of the present disclosure is directed to a method of adjusting a flow of a solder wave of a wave solder nozzle assembly of a wave soldering machine. In one embodiment, the method comprises: delivering solder material to a wave soldering nozzle assembly including a solder distribution baffle; selectively delivering solder material to portions of the solder distribution baffle to produce a solder wave having a desired width by selectively controlling two pumps positioned within a flow duct in a reservoir of a solder pot and in fluid communication with a respective chamber along a width of the solder distribution baffle; adjusting a flow of the solder wave with an exit wing actuator coupled to an exit wing to adjust a position of the exit wing; and performing a wave soldering operation on a printed circuit board.

Embodiments of the method further may include controlling a first pump associated with a first chamber of a nozzle core frame of the wave soldering nozzle assembly and controlling a second pump associated with a second chamber of the nozzle core frame of the wave soldering assembly. The first pump and the first chamber may be configured to deliver solder material to a load side of the solder distribution baffle and the second pump and the second chamber are configured to deliver solder material to an unload side of the solder distribution baffle. The first pump, the second pump and the exit wing actuator may be controlled by a controller. The controller may be configured to operate the first pump and to activate the exit wing actuator to move the exit wing to the lowered position to provide a minimum contact length of the solder wave and to operate the first pump and the second pump and to activate the exit wing actuator to move the exit wing to the raised position to provide a maximum contact length of the solder wave.

Yet another aspect of the present disclosure is directed to a wave soldering station of a wave soldering machine configured to perform a wave soldering operation on a printed circuit board. In one embodiment, the wave soldering station comprises a solder pot having a reservoir of solder material, a flow duct positioned in the reservoir of the solder pot, and a core frame supported by the flow duct. The core frame includes a first chamber and a second chamber. The wave soldering station further comprises a first pump configured to deliver solder material to the first chamber, a second pump configured to deliver solder material to the second chamber, and a wave soldering nozzle assembly supported by the core frame. The wave soldering nozzle assembly includes a solder distribution baffle configured to create a solder wave, and an exit wing coupled to the core frame and configured to move from a lowered position to enable increased solder flow and a raised position to decrease flow of solder material. The first pump, the second pump and the exit wing are configured to control the flow of solder through the solder distribution baffle to vary a contact length of the solder wave.

Embodiments of the wave soldering station further may include a first pump impeller positioned within the flow duct in the reservoir of the solder pot and a second pump impeller positioned within the flow duct in the reservoir of the solder pot. The flow of solder material within each chamber of the two chambers may be controlled by a respective pump impeller of the two pump impellers. The first pump impeller and the first chamber may be configured to deliver solder material to a load side of the solder distribution baffle. The second pump impeller and the second chamber may be configured to deliver solder material to an unload side of the solder distribution baffle. The operation of the first pump impeller and the movement of the exit wing to the lowered position may provide a minimum contact length of the solder wave and the operation of the first pump impeller and the second pump impeller and the movement of the exit wing to the raised position may provide a maximum contact length of the solder wave.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
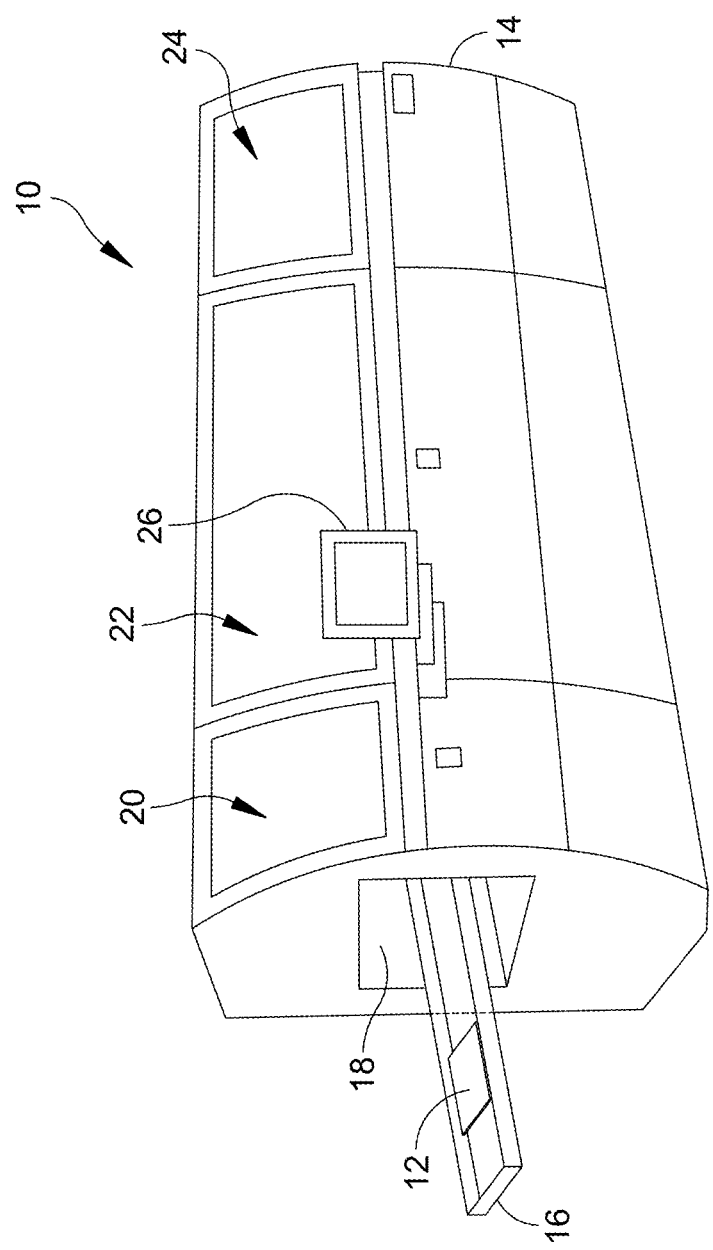
FIG. 1 is a perspective view of a wave soldering machine.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the present disclosure are directed to controlling the flow of molten solder over a nozzle in order to vary a width and a height of a solder wave. One objective is to provide the ability to adjust (reduce) a width of the solder wave to reduce dross produced by the solder wave. An additional objective is to automate this adjustment and allow for computer control to eliminate the need for human intervention when adjustment is needed based on the product being processed.

For purposes of illustration, and with reference to FIG. 1, embodiments of the present disclosure will now be described with reference to a wave soldering machine, generally indicated at 10, which is used to perform a solder application on a printed circuit board 12. The wave soldering machine 10 is one of several machines in a printed circuit board fabrication/assembly line. As shown, the wave soldering machine 10 includes a housing or frame 14 adapted to house the components of the machine. The arrangement is such that a conveyor 16 delivers printed circuit boards 12 to be processed by the wave soldering machine 10. Upon entering the wave soldering machine 10, each printed circuit board 12 travels along an inclined path (e.g., six degrees with respect to horizontal) along the conveyor 16 through a tunnel 18, which includes a fluxing station, generally indicated at 20, and a pre-heating station, generally indicated at 22, to condition the printed circuit board 12 for wave soldering. Once conditioned (i.e., heated), the printed circuit board 12 travels to a wave soldering station, generally indicated at 24, to apply solder material to the printed circuit board 12. A controller 26 is provided to automate the operation of the several stations of the wave soldering machine 10, including but not limited to the fluxing station 20, the pre-heating station 22, and the wave soldering station 24, in the well-known manner.

Figure 2:
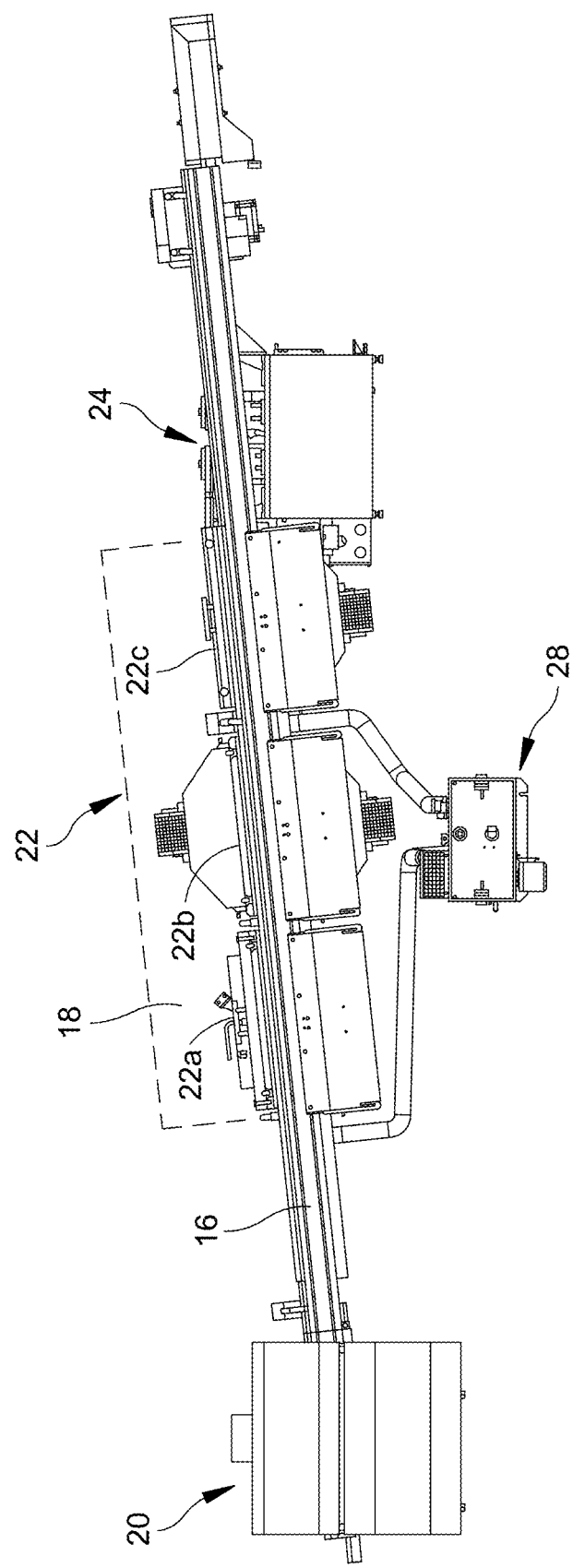
FIG. 2 is a side elevational view of the wave soldering machine with external packaging removed to reveal internal components of the wave soldering machine.
Figure 3:
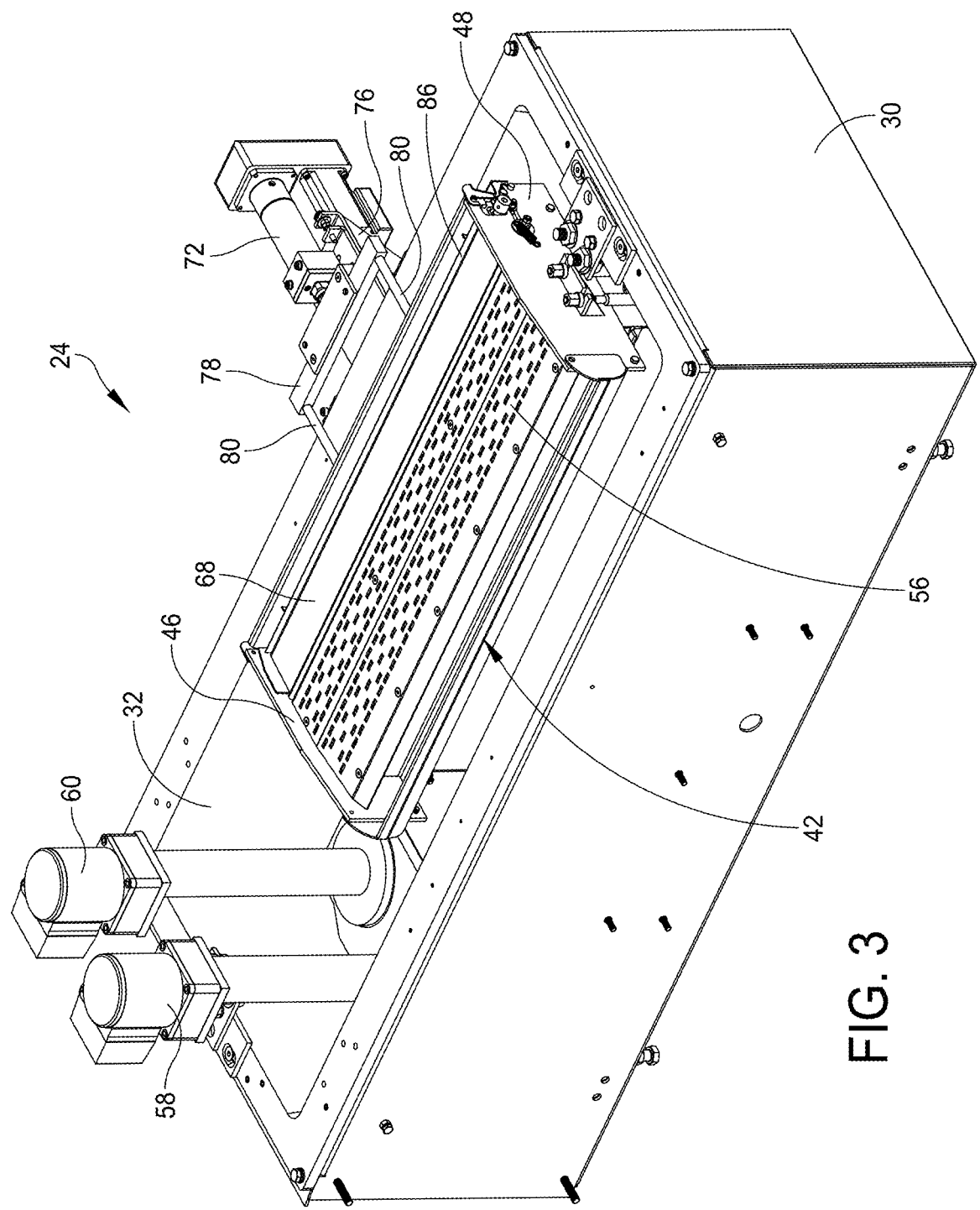
FIG. 3 is a perspective view of a wave soldering station of an embodiment of the present disclosure.
Figure 4:
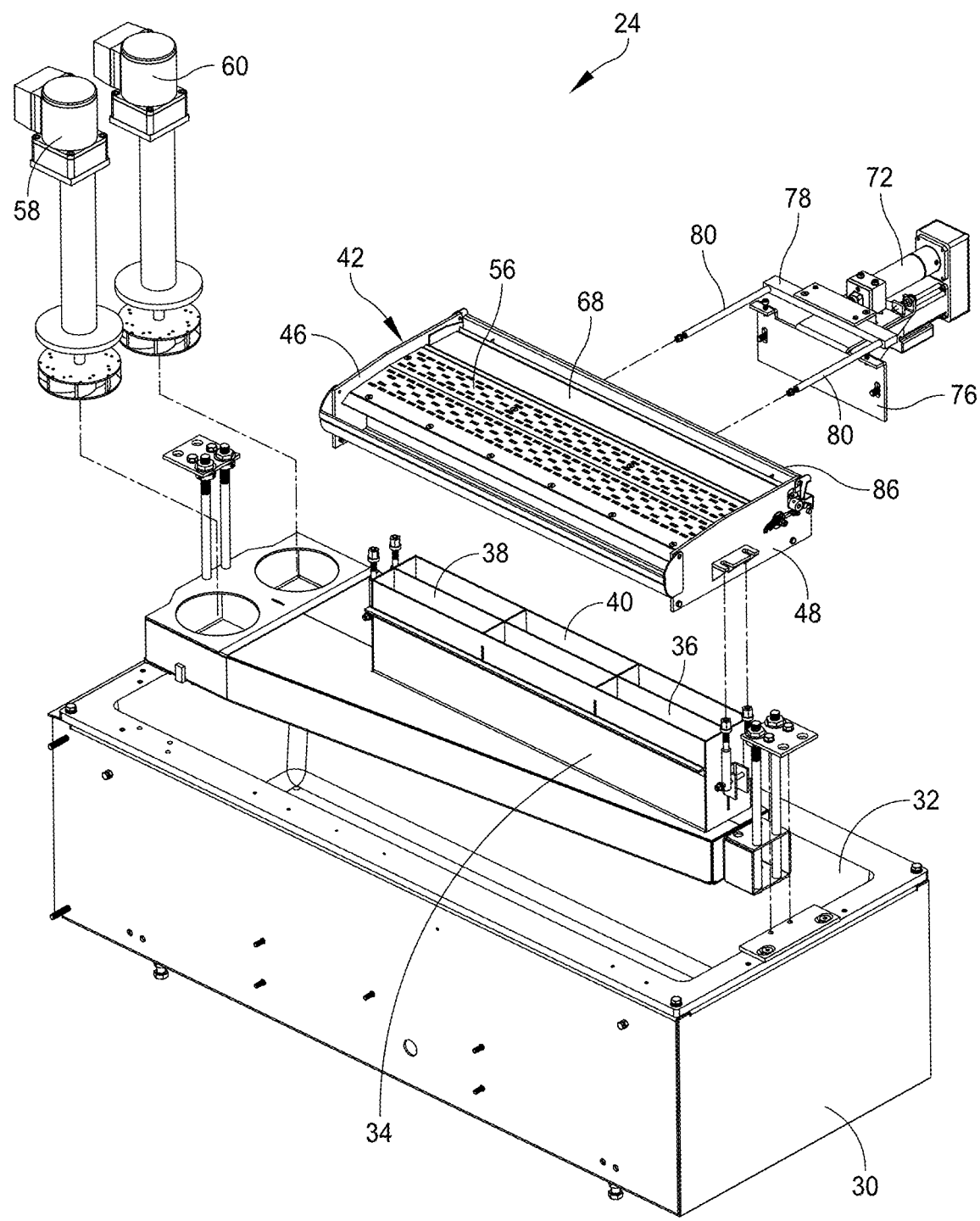
FIG. 4 is an exploded perspective view of the wave soldering station.
Figure 5:
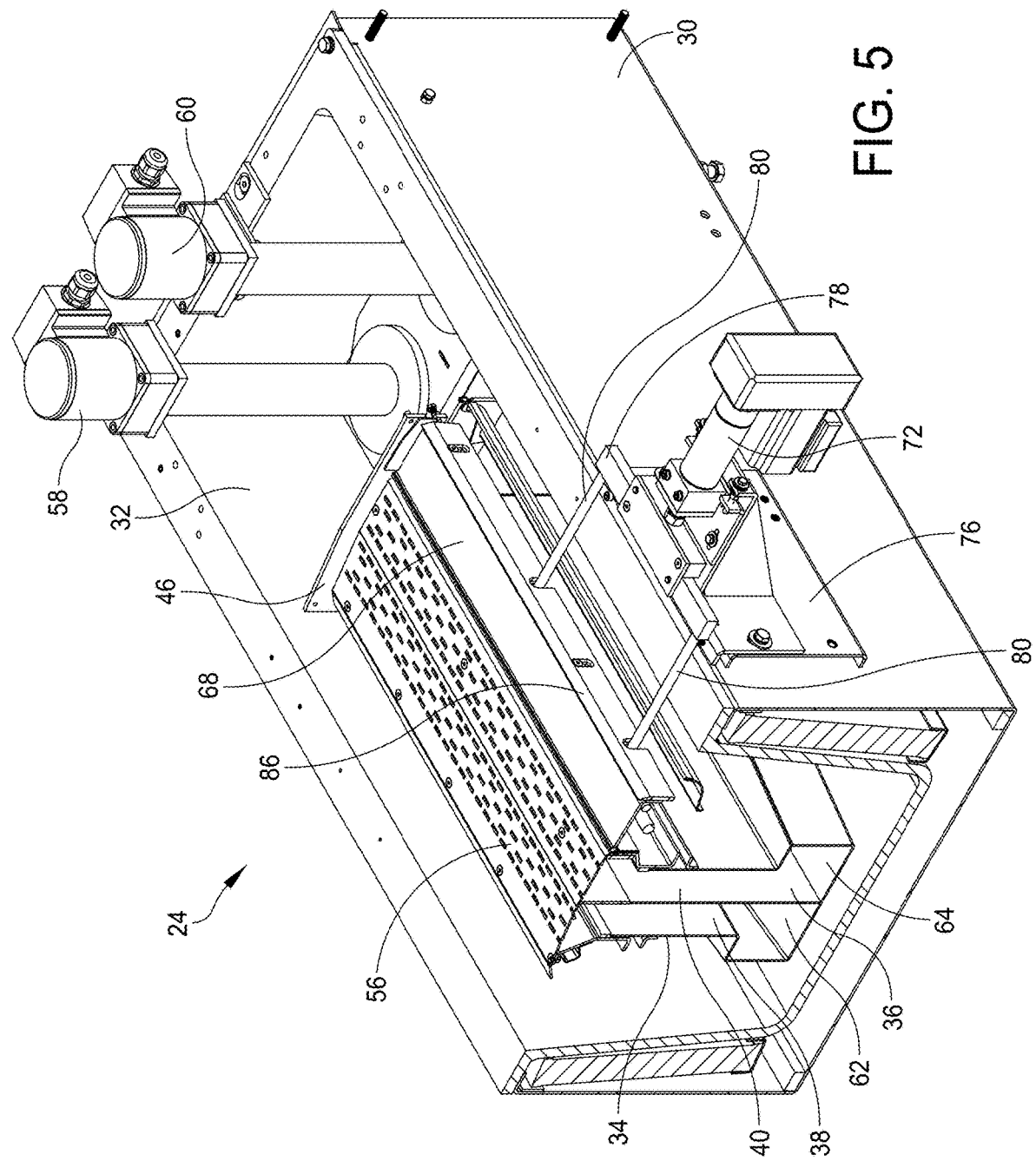
FIG. 5 is a cross-sectional perspective view of the wave soldering station.

Referring to FIG. 2, the fluxing station 20 is configured to apply flux to the printed circuit board 12 as it travels on the conveyor 16 through the wave soldering machine 10. The pre-heating station includes several pre-heaters (e.g., pre-heaters 22a, 22b and 22c), which are designed to incrementally increase the temperature of the printed circuit board 12 as it travels along the conveyor 16 through the tunnel 18 to prepare the printed circuit board 12 for the wave soldering process. As shown and described in greater detail below, the wave soldering station 24 includes a wave soldering nozzle assembly in fluid communication with a reservoir of solder material. A pump is provided within the reservoir to deliver molten solder material to the wave soldering nozzle assembly from the reservoir. Once soldered, the printed circuit board 12 exits the wave soldering machine 10 via the conveyor 16 to another station provided in the fabrication line, e.g., a pick-and-place machine.

In some embodiments, the wave soldering machine 10 further may include a flux management system, generally indicated at 28, to remove volatile contaminants from the tunnel 18 of the wave soldering machine. As shown in FIG. 2, the flux management system 28 is positioned below the pre-heating station 22. In one embodiment, the flux management system is supported by the housing 14 within the wave soldering machine, and is in fluid communication with the tunnel 18, which is schematically illustrated in FIG. 2. The flux management system 28 is configured to receive contaminated gas from the tunnel 18, treat the gas, and return clean gas back to the tunnel. The flux management system 28 is particularly configured to remove volatile contaminants from the gas, especially in inert atmospheres.

Embodiments of the present disclosure are directed to minimizing dross associated with the molten solder. Different combinations of tin, lead and other metals are used to create lead-based and lead-free solders. Dross is a mass of solid impurities floating on the surface of the molten solder or dispersed within the molten solder. For solder, dross has a tendency to form on the surface of the tin-based molten metal, with oxidized impurities creating the dross.

Referring to FIGS. 3-7, the wave soldering station 24 includes a solder pot 30 that defines a reservoir 32 configured to contain molten solder. In one embodiment, the solder pot 30 is a box-shaped structure that supports the components of the wave soldering station 24 including a flow duct 34 having two chambers within the reservoir 32. As shown, a divider 36 is provided in the flow duct 34 to create a first chamber 38 and a second chamber 40. One or more cross dividers (not designated) can be provided to separate the respective chambers 38, 40. For example, two cross dividers can be provided to separate the first chamber 38 and the second chamber 40 to include three passages. The flow duct 34 is designed to deliver pressurized molten solder to an opening or nozzle of a wave soldering nozzle assembly, which is generally indicated at 42. The wave soldering nozzle assembly 42 is configured to channel the molten solder to the bottom of the printed circuit board 12 and provides for smooth flow of solder back into the reservoir 32. Specifically, the wave soldering nozzle assembly 42 is capable of adjusting a width and a height of the solder wave when performing a wave soldering operation.

Figure 8:
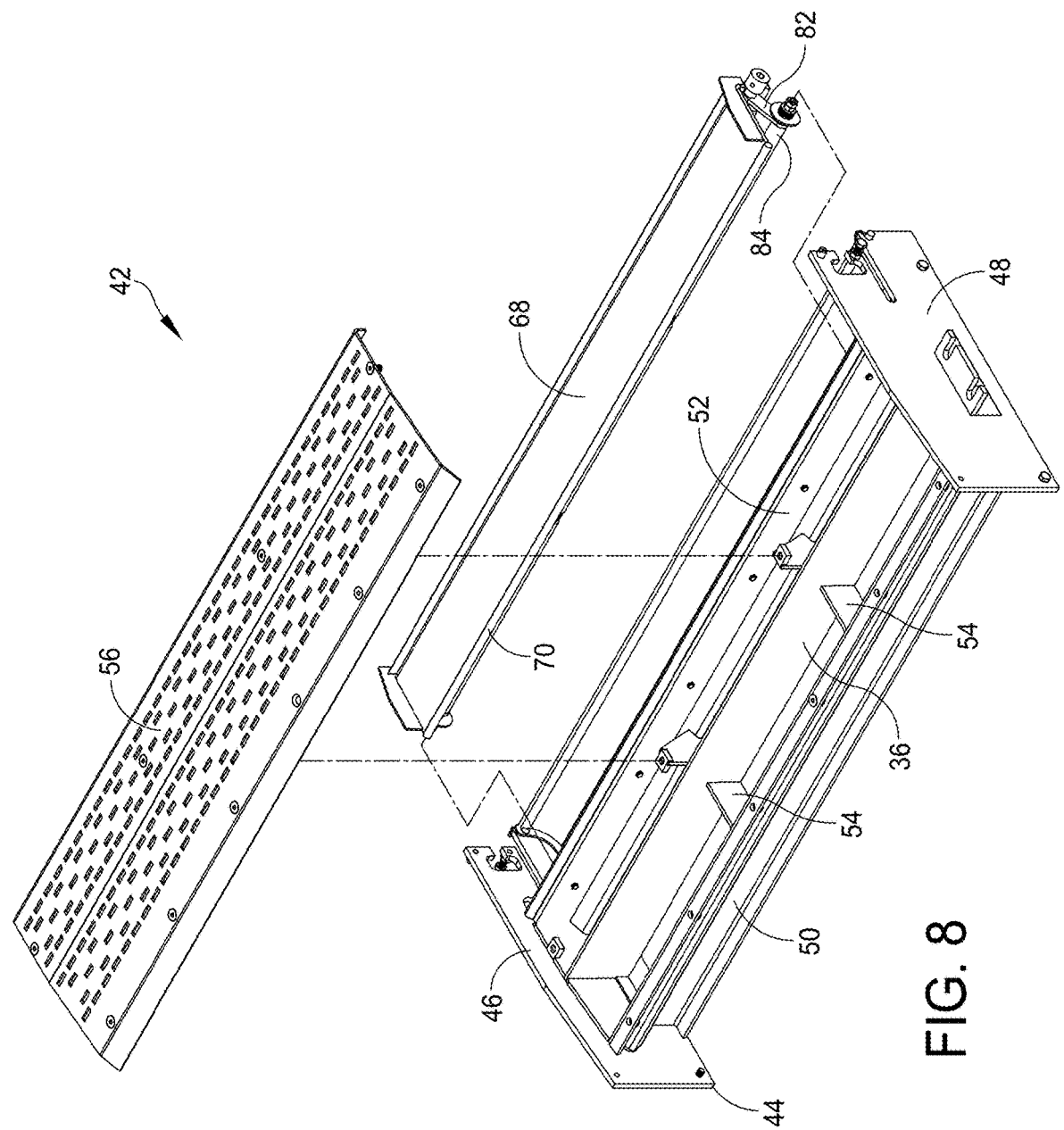
FIG. 8 is an exploded perspective view of a wave soldering nozzle assembly of the wave soldering station.

Referring additionally to FIG. 8, the wave soldering nozzle assembly 42 includes a nozzle core frame 44 having two end walls 46, 48, a first longitudinal support element 50 and a second longitudinal support element 52 that extends between the end walls 46, 48. As shown, the nozzle core frame 44 further may include several cross support elements, each indicated at 54, that extend between the first longitudinal support element 50 and the second longitudinal support element 52. The nozzle core frame 44 also directs the solder flow through a nozzle throat defined between the first and second longitudinal support elements 50, 52. The wave soldering nozzle assembly 42 further includes an elongate solder distribution baffle 56 that is secured to the first longitudinal support element 50 and the second longitudinal support element 52 of the nozzle core frame 44. The solder distribution baffle 56 is secured to the first longitudinal support element 50 and the second longitudinal support element 52 with screws through openings provided along sides of the solder distribution baffle 56. In one embodiment, the solder distribution baffle 56 includes a unique pattern of elongate openings to enable molten solder to flow through the solder distribution baffle 56.

The divider 36 extends through the nozzle core frame 44 to extend the first chamber 38 and the second chamber 40 to the solder distribution baffle 56. In the shown embodiment, molten solder material is delivered to a load side of the solder distribution baffle 56 through the first chamber 38 and molten solder material is delivered to an unload side of the solder distribution baffle 56 through the second chamber 40. As will be described in greater detail below, the amount of molten solder material can be controlled by delivering molten solder material to one of the first chamber 38 and the second chamber 40, or both.

The wave soldering station 42 further includes two pump impellers, a first pump impeller 58 and a second pump impeller 60, which are positioned within the flow duct 34 in the reservoir 32 of the solder pot 30. As used herein, the pump impellers 58, 60 are sometimes referred to as pumps. The first and second pump impellers 58, 60 pressurize the molten solder in the flow duct 34 to pump the molten solder vertically through respective first and second chambers 38, 40 and the wave soldering nozzle assembly 42. In one embodiment, each pump impeller 58, 60 is a centrifugal pump that is suitably sized to pump the molten solder to the nozzle of the wave soldering nozzle assembly 42. The wave soldering nozzle assembly 42 is configured to generate a solder wave that is provided to attach components on the circuit board 12 in the manner described below, and to optimize a contact length on which the solder wave contacts the printed circuit board 12 during processing.

As noted, the flow duct 34 includes the two chambers 38, 40. Each chamber 38, 40 includes an inlet channel, which is connected to a respective pump impeller 58, 60. In the shown example, the first pump impeller 58 is connected first chamber 38 by a first inlet channel 62, and the second pump impeller 60 is connected to the second chamber 40 by a second inlet channel 64. Thus, flow of molten solder to the solder distribution baffle 56 is controlled by controlling the first and second pump impellers 58, 60. The flow of molten solder through the first and second chambers 38, 40 can be independently controlled by controlling the pump impellers 58, 60, respectively, with the controller 26, which is coupled or otherwise connected to the pump impellers 58, 60. For example, by only operating the first pump impeller 58, molten solder is delivered to the load side of the solder distribution baffle 56 via the first chamber 38 to reduce a width of the solder wave. In another example, by operating the first and second pump impellers 58, 60, molten solder is delivered to the load side of the solder distribution baffle 56 via the first chamber 38 and to the unload side of the solder distribution baffle 56 to increase a width of the solder wave. Thus, the result is that the solder wave can be controlled by operating the first and second pump impellers 58, 60.

Figure 6:
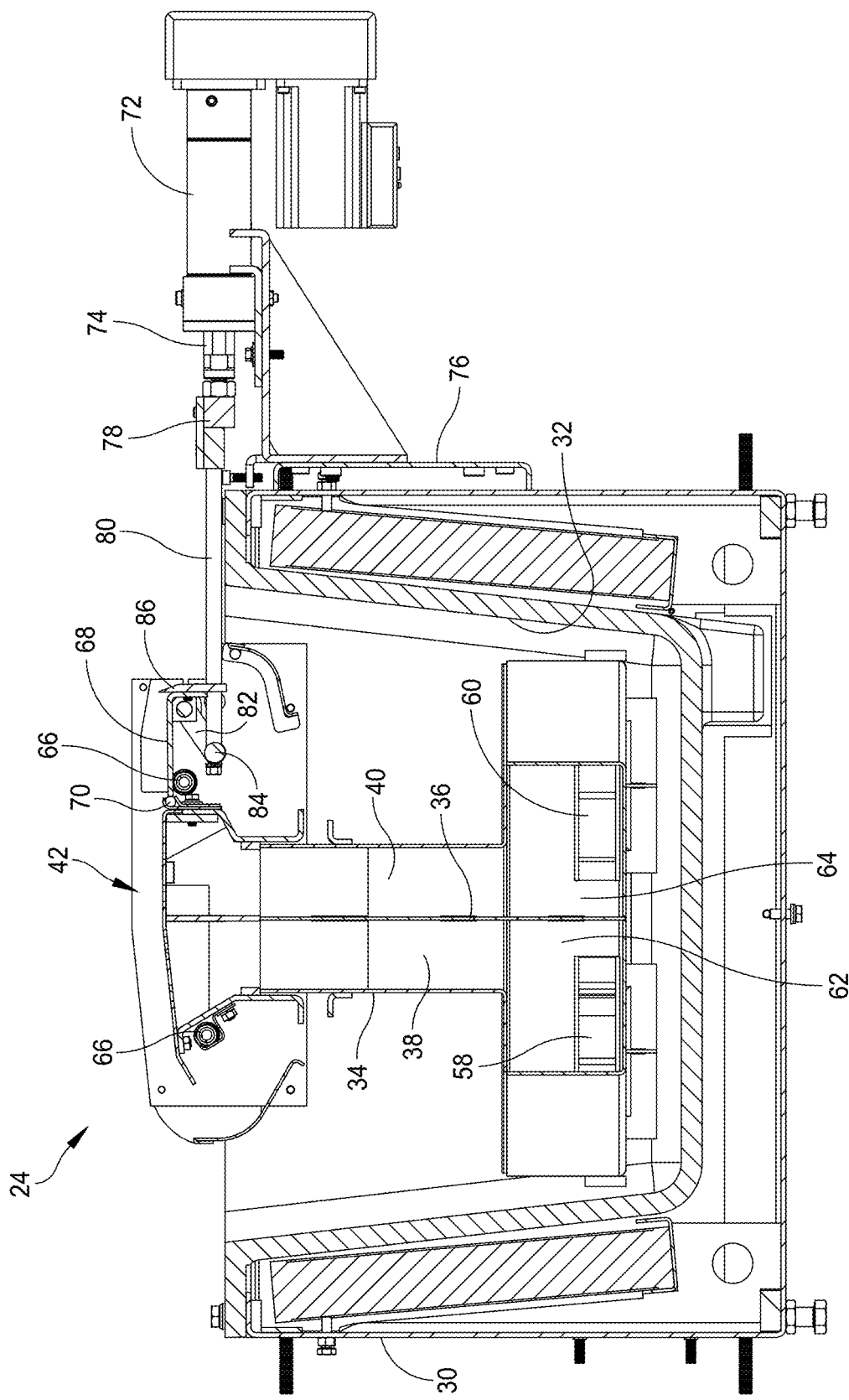
FIG. 6 is a cross-sectional view of the wave soldering station shown an exit wing in a lowered position.
Figure 7:
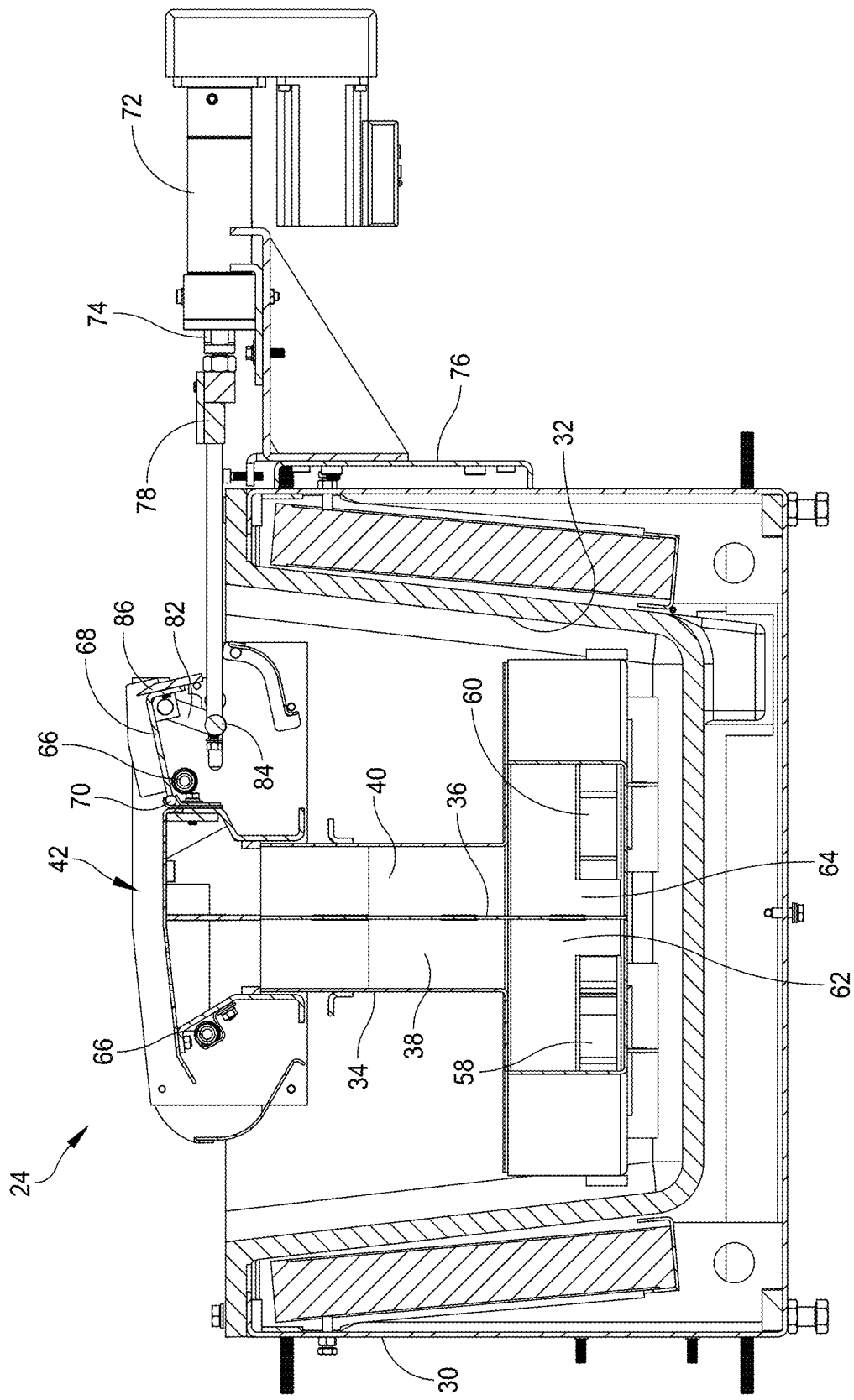
FIG. 7 is a cross-sectional view of the wave soldering station showing the exit wing in a raised position.

As shown best in FIGS. 6 and 7, an inert atmosphere surrounding the solder wave can be created by providing one or more nitrogen tubes to create an inert atmosphere during the wave soldering process. As shown, two nitrogen tubes, each indicated at 66, are provided adjacent to the nozzle core frame 44 and below the solder distribution baffle 56. Additional nitrogen or gas diffuser tubes can be provided in the space above the solder distribution baffle 56 and below a cover (not shown) of the wave soldering nozzle assembly 42.

Referring back to FIGS. 3-7, the wave soldering nozzle assembly 42 further includes an exit wing 68 to control the solder flow over the back of the nozzle of the solder wave generated by the wave solder machine 10. To allow for an adjustment of the flow of the solder wave exiting the nozzle of the wave soldering nozzle assembly 42, the exit wing 68 is hingedly secured to the second longitudinal side wall 52 of the nozzle core frame 44 by a hinge 70. The exit wing 68 is rotatable about the hinge 70 by an actuator 72 via a linkage. The actuator 72 is sometimes referred to herein as an exit wing actuator. The position of the exit wing 68 relative to the nozzle core frame 44 can be controlled in real-time by controlling the longitudinal displacement of an actuator arm 74 of the actuator and thus the flow of the solder wave over the back of the nozzle to decrease or increase by raising and lowering the exit wing 68, respectively.

The actuator 72 is secured to the solder pot 30 by an actuator support frame 76, which is secured to a side wall of the solder pot 30 by suitable fasteners, such as bolts. The actuator support frame 76 could alternately be secured to the solder pot 30 by another method, such as welding or rivets. As shown, the actuator 72 is secured to the actuator support frame 76, which is configured to support the actuator 72 firmly relative to the solder pot 30. The actuator 72 is positioned next to the wave soldering nozzle assembly 42 and forms part of the assembly to adjust a position of the exit wing 68 of the wave soldering nozzle assembly 42 with respect to the nozzle core frame 44 via the linkage coupled to the exit wing 68 and to the actuator 72. The actuator 72 includes the actuator arm 74 that is coupled to the linkage by an actuator block 78. The linkage is described in more detail below.

In one embodiment, the actuator 72 is a linear actuator, so the actuator arm 74 moves in a longitudinal direction. The actuator block 78 connects the actuator arm 74 to two connecting links, each indicated at 80 to transfer movement from the actuator arm 74 to the exit wing 68. Thus, longitudinal movement of the actuator arm 74 moves the actuator block 78 and the connecting links 80 in the same longitudinal direction as the actuator arm 74. In some embodiments, the actuator 72 and the connecting links 80 are oriented so the actuator arm 74 moves the connecting links 80 in a horizontal direction. In certain embodiments, the actuator 72 includes an electromechanical actuator that provides movement for the adjustment of the position of the exit wing 68. The actuator 72 is driven by computer controlled machine software (supported by the controller 26) and incorporates an encoder that can relay position indication to the machine software. Via the controller 26, the actuator 72 can be controlled in real-time to achieve a desired position of the exit wing 68. The controller 26 is in communication with the actuator 72 and is configured to cause the actuator 72 to adjust the position of the exit wing 68 during operation of the wave soldering machine 10. In turn, the actuator 72 is configured to receive commands from the controller 26 to cause the actuator 72 to adjust the position of the exit wing 68 during operation of the wave soldering machine 10.

In one embodiment, the exit wing 68 includes a first end that is coupled to the second longitudinal side wall 52 of the nozzle core frame 44 by the hinge 70 and a second end that is coupled to the actuator 72 via a rotating link 82 of the linkage so the actuator 72 can cause the second end of the exit wing 68 to rotate about the hinge 70 at the first end of the exit wing 68. Rotating the exit wing 68 about the hinge 70 changes the flow of the solder wave passing over the exit wing 68. In particular, rotating the exit wing 68 so the second end of the exit wing 68 moves upwardly to a raised position causes the flow of the solder wave over the exit wing 68 to decrease while rotating the exit wing 68 so the second end of the exit wing 68 moves downwardly to a lowered position causes the flow of the solder wave over the exit wing 68 to increase.

As mentioned above, the linkage allows the actuator 72 to adjust a position of the exit wing 68 with respect to the nozzle core frame 44. In particular, the linkage allows longitudinal movement of the actuator arm 74 of the actuator 72 to adjust an angle of an upper surface of the exit wing 68 with respect to a horizontal direction. In one embodiment, the linkage includes the connecting links 80, the rotating link 82, a cross bar 84. The rotating link 82 is coupled to the second end of the exit wing 68 by the cross bar 84, which is in turn coupled to the actuator block 78 by the connecting links 80.

The rotating link 82 has a first end that is rotatably coupled to the second end of the exit wing 68 and a second end that is rotatably coupled to the cross bar 84. The cross bar 84 extends perpendicularly to the rotating link 82. Each connecting link 80 has a first end that is coupled to the cross bar 84 and a second end that is coupled to the actuator block 78. The connecting links 80 extend perpendicularly to the cross bar 84 and parallel to the actuator arm 74. When the upper surface of the exit wing 68 extends substantially in a horizontal direction, the cross bar 84 is located beneath the exit wing 68 and longitudinally between the first end of the exit wing 68 and the second end of the exit wing 68.

The longitudinal displacement of the actuator arm 74 is able to cause the exit wing 68 to rotate about the hinge 70. An axial direction of the actuator arm 74 is parallel with an axial direction of the connecting links 80. Thus, the actuator arm 74 is configured to move the connecting links 80 along the horizontal direction along the axis of the direction of the actuator arm 74. Because the cross bar 84 is coupled to the connecting links 80, extension or retraction of the actuator arm 74 results in translation of the cross bar 84. Because the rotating link 82 is rotatably coupled to the cross bar 84 and because the actuator 72 and the wave soldering nozzle assembly 42 are secured to the solder pot 30, this translation of the cross bar 84 results in a rotation of the exit wing 86.

Referring back to FIGS. 9 and 10, the actuator arm 74 is in an extended position in FIG. 9 and in a retracted position in FIG. 10. The second end of the exit wing 68 is shown to be lower (lowered position) in FIG. 9 than in FIG. 10 (raised position). A back gate 86 is secured to the second end of the exit wing 68. The controller 26, in addition to being configured to operate the first pump impeller 58 and the second pump impeller 60, is configured to operate the actuator 72 to adjust the orientation of the exit wing 68 to change the flow of solder over the back gate 86 of the exit wing 68. Thus, the controller 26 is configured to achieve optimum soldering characteristics of the wave soldering nozzle assembly 42. Optimal soldering characteristics are achieved when there is no flow over the back gate 86 of the exit wing 68 when the conveyor 16 is not carrying parts to be soldered, such as printed circuit boards 12, over the wave solder assembly. However, once the printed circuit board 12 carried by the conveyor 16 enters a solder wave, indicated at 88 by dashed lines in FIGS. 9 and 10, the solder starts to flow over the back gate 86 of the exit wing 68 at the same velocity as the velocity $V_{pcb}$ of the printed circuit board 12 along the conveyor 16. Once the printed circuit board 12 exits the solder wave 88, the solder flow over the back gate 86 of the exit wing 68 stops again.

Figure 9:
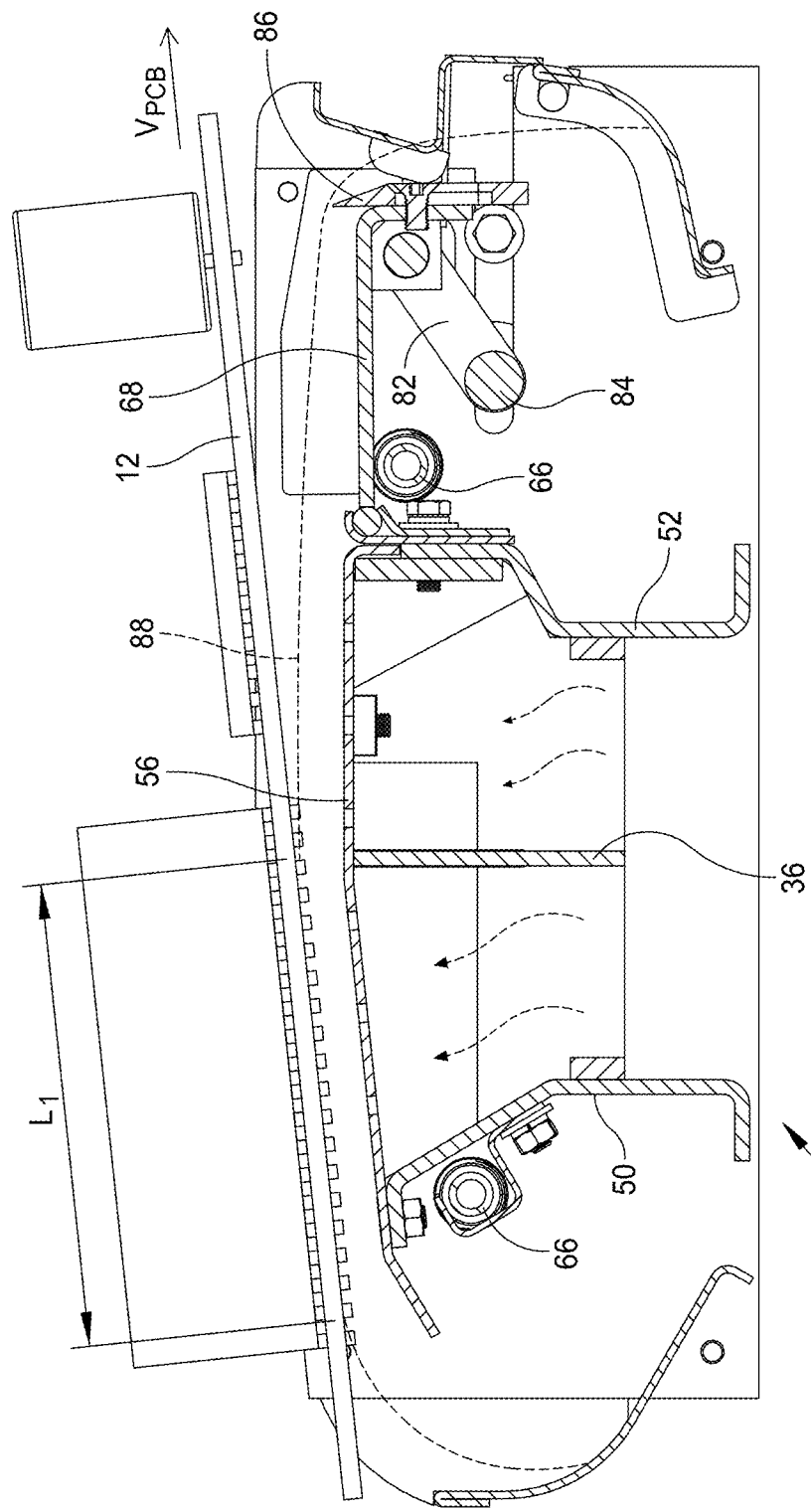
FIG. 9 is an enlarged cross-sectional view of the wave soldering nozzle assembly showing a minimal contact length.
Figure 10:
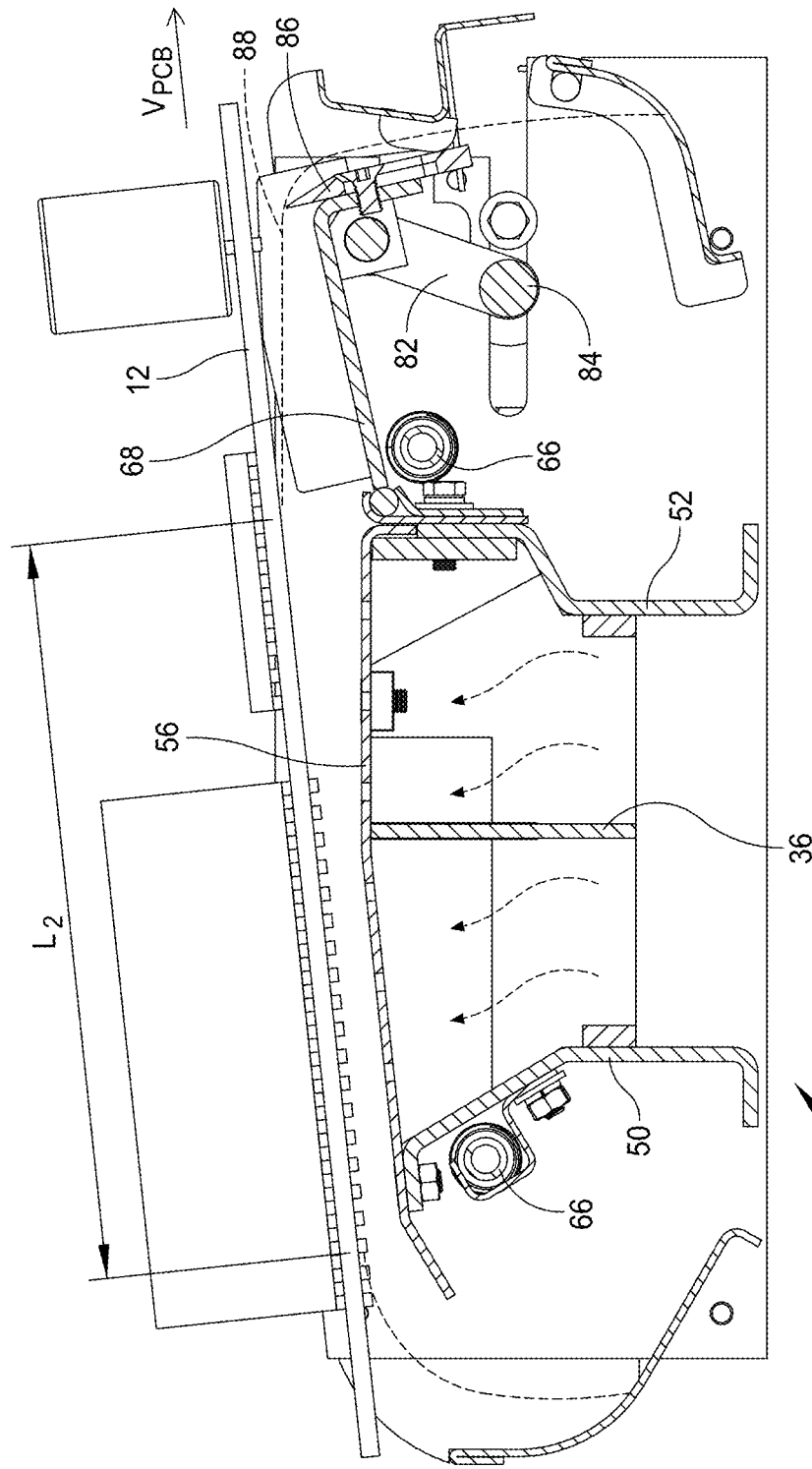
FIG. 10 is an enlarged cross-sectional view of the wave soldering nozzle assembly showing a maximum contact length.

The orientations of the exit wing 68 that are shown in FIGS. 9 and 10 are just two examples of orientations of the exit wing 68. The rotational range of the exit wing may be selected according to the desired performance parameters of the system, such as the desired range of solder wave heights. In various embodiments, the range of rotation of the exit wing 68 can extend beyond the orientations shown in FIGS. 9 and 10.

To achieve a minimum contact length $L_1$, which is shown in FIG. 9, the first pump impeller 58 is operated at a high revolutions per minute (RPM) to produce an increased flow of molten solder material through the load side of the solder distribution baffle 56, the second pump impeller 60 is operated at a low RPM to produce a decreased flow of molten solder material through the unload side of the solder distribution baffle 56, and the exit wing 68 is lowered. To achieve a maximum contact length $L_2$, which is shown in FIG. 10, the first pump impeller 68 is operated at a high RPM to produce an increased flow of molten solder material through the load side of the solder distribution baffle 56, the second pump impeller 60 is operated at a high RPM to produce an increased flow of molten solder material through the unload side of the solder distribution baffle 56, and the exit wing 68 is raised to accommodate the increased flow of molten solder material over the exit wing 68. The contact length of the solder wave 88 can be manipulated by operation of the pump impellers 58, 60 and the exit wing 68 to achieve a desired contact length between the minimum contact length $L_1$ and the maximum contact length $L_2$.

Although the above description of solder flow relates to printed circuit boards 12 being carried by the conveyor 16, similar solder flow would occur for other parts to be soldered that are carried by the conveyor 16 over the wave soldering nozzle assembly 42.

Embodiments of the present disclosure are directed to a method of adjusting a flow of the solder wave 88 of the wave solder nozzle assembly 42 of the wave soldering machine 10. In one embodiment, the method includes delivering molten solder material to the wave soldering nozzle assembly 42 including the solder distribution baffle 56, and selectively delivering the molten solder material to portions of the solder distribution baffle 56 to produce the solder wave 88 having a desired width by selectively controlling the two pump impellers 58, 60, which are positioned within the flow duct in the reservoir 32 of the solder pot 30 and in fluid communication with the respective chamber 38, 40 along a width of the solder distribution baffle 56. The method further includes adjusting the flow of the solder wave 88 by the exit wing actuator 72 coupled to the exit wing 68 to adjust the position of the exit wing 68 and performing the wave soldering operation on the printed circuit board 12. It is noted that selectively controlling the two pump impellers 58, 60 includes controlling the first pump impeller 58 associated with the first chamber 38 of the nozzle core frame 44 of the wave soldering nozzle assembly 42 and controlling the second pump impeller 60 associated with the second chamber 40 of the nozzle core frame 44 of the wave soldering nozzle assembly 42. The first pump impeller 58 and the first chamber 38 are configured to deliver solder material to the load side of the solder distribution baffle 56 and the second pump impeller 60 and the second chamber 40 are configured to deliver solder material to the unload side of the solder distribution baffle 56. The first pump impeller 58, the second pump impeller 60 and the exit wing actuator 72 are controlled by the controller 26. The arrangement is such that the controller 26 is configured to operate the first pump impeller 58 and to activate the exit wing actuator 72 to move the exit wing 68 to the lowered position to provide a minimum contact length $L_1$ of the solder wave 88 and to operate the first pump impeller 58 and the second pump impeller 60 and to activate the exit wing actuator 72 to move the exit wing 68 to the raised position to provide a maximum contact length $L_2$ of the solder wave 88.

Various controllers may execute various operations discussed above. For example, as discussed above, the controller, such as controller 26, may control the components of the wave soldering machine 10 including the wave soldering station 24, amongst other operations. Using data stored in associated memory and/or storage, the controller may execute one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

With each embodiment, solder flow through the nozzle can be controlled to reduce and even prevent dross recirculation through the nozzle. By reducing the width of the solder wave, dross is reduced. Each embodiment enables the width of the solder wave to be reduced.

In some embodiments, the wave soldering nozzle assembly further includes a dross box that is secured to the nozzle frame and configured to reduce turbulence as the solder travels back to the reservoir, thereby further reducing solder balls that can form within the reservoir.

In some embodiments, one or more nitrogen tubes can be provided to create an inert atmosphere during the wave soldering process.

In some embodiments, the minimum and the maximum contact can be varied.

As used herein, "solder wave width" describes a cross-sectional dimension of the actual solder wave and "contact length" describes a distance on a printed circuit board that is in contact with the wave at any given point in time. The word "length" as used herein references contact length that is parallel to the direction of travel of the printed circuit board.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A wave soldering machine to perform a wave soldering operation on a printed circuit board, the wave soldering machine comprising:
   a housing;

a conveyor coupled to the housing, the conveyor being configured to deliver a printed circuit board through the housing;

a wave soldering station coupled to the housing and the conveyor, the wave soldering station including
a solder pot having a reservoir of solder material,
a flow duct positioned in the reservoir of the solder pot,
a core frame supported by the flow duct, the core frame including a first chamber and a second chamber,
a first pump configured to deliver solder material to the first chamber,
a second pump configured to deliver solder material to the second chamber, and
a wave soldering nozzle assembly supported by the core frame, the wave soldering nozzle assembly having a solder distribution baffle configured to create a solder wave, and an exit wing coupled to the core frame and configured to move from a lowered position to enable increased solder flow and a raised position to decrease flow of solder material; and a controller coupled to the wave soldering station to control the operation of the first pump and the second pump and to control the movement of the exit wing to control the flow of solder through the solder distribution baffle to vary a contact length of the solder wave.

2. The wave soldering machine of claim 1, wherein the first pump includes a first pump impeller positioned within the flow duct in the reservoir of the solder pot and the second pump includes a second pump impeller positioned within the flow duct in the reservoir of the solder pot.

3. The wave soldering machine of claim 2, wherein the flow of solder material within each chamber of the two chambers is controlled by a respective pump impeller of the two pump impellers.

4. The wave soldering machine of claim 3, wherein each pump impeller of the two pump impellers includes a centrifugal pump to pump the solder material to the wave soldering nozzle assembly.

5. The wave soldering machine of claim 3, wherein each chamber of the two chambers includes an inlet, which is connected to a respective pump impeller.

6. The wave soldering machine of claim 3, wherein each pump impeller of the two pump impellers is coupled to the controller to control the flow of solder material provided by the pump impeller.

7. The wave soldering machine of claim 3, wherein the controller controls the first pump impeller to deliver solder material to a load side of the solder distribution baffle through the first chamber, and the controller controls the second pump impeller to deliver solder material to an unload side of the solder distribution baffle through the second chamber.

8. The wave solder machine of claim 7, wherein the controller is configured to operate the first pump impeller and to activate an exit wing actuator to move the exit wing to the lowered position to provide a minimum contact length of the solder wave and to operate the first pump impeller and the second pump impeller and to activate the exit wing actuator to move the exit wing to the raised position to provide a maximum contact length of the solder wave.

9. The wave soldering machine of claim 1, wherein the exit wing is rotatable about a hinge with respect to the core frame to move the exit wing between the lowered position and the raised position.

10. The wave soldering machine of claim 9, wherein the wave solder nozzle assembly further includes an exit wing actuator connected to the exit wing and coupled to the controller, the exit wing actuator being configured to adjust the position of the exit wing between the lowered position and the raised position.

11. The wave soldering machine of claim 10, wherein the exit wing actuator is connected to the exit wing by a linkage, the linkage including at least one rotating link having a first end rotatably coupled to an end of the exit wing and a second end that is rotatably coupled to an actuator arm of the exit wing actuator.

12. A method of adjusting a flow of a solder wave of a wave solder nozzle assembly of a wave soldering machine, the method comprising:
delivering solder material to a wave soldering nozzle assembly including a solder distribution baffle;
selectively delivering solder material to portions of the solder distribution baffle to produce a solder wave having a desired width by selectively controlling two pumps positioned within a flow duct in a reservoir of a solder pot and in fluid communication with a respective chamber along a width of the solder distribution baffle;
adjusting a flow of the solder wave with an exit wing actuator coupled to an exit wing to adjust a position of the exit wing; and
performing a wave soldering operation on a printed circuit board.

13. The method of claim 12, wherein selectively controlling two pumps includes controlling a first pump associated with a first chamber of a nozzle core frame of the wave soldering nozzle assembly and controlling a second pump associated with a second chamber of the nozzle core frame of the wave soldering assembly.

14. The method of claim 13, wherein the first pump and the first chamber are configured to deliver solder material to a load side of the solder distribution baffle and the second pump and the second chamber are configured to deliver solder material to an unload side of the solder distribution baffle.

15. The method of claim 13, wherein the first pump, the second pump and the exit wing actuator are controlled by a controller.

16. The method of claim 15, wherein the controller is configured to operate the first pump and to activate the exit wing actuator to move the exit wing to the lowered position to provide a minimum contact length of the solder wave and to operate the first pump and the second pump and to activate the exit wing actuator to move the exit wing to the raised position to provide a maximum contact length of the solder wave.

17. A wave soldering station of a wave soldering machine configured to perform a wave soldering operation on a printed circuit board, the wave soldering station comprising:
a solder pot having a reservoir of solder material;
a flow duct positioned in the reservoir of the solder pot;
a core frame supported by the flow duct, the core frame including a first chamber and a second chamber;
a first pump configured to deliver solder material to the first chamber;
a second pump configured to deliver solder material to the second chamber; and
a wave soldering nozzle assembly supported by the core frame, the wave soldering nozzle assembly including
a solder distribution baffle configured to create a solder wave, and
an exit wing coupled to the core frame and configured to move from a lowered position to enable increased solder flow and a raised position to decrease flow of solder material, wherein the first pump, the second pump and the exit wing are configured to control the flow of solder through the solder distribution baffle to vary a contact length of the solder wave.

18. The wave soldering station of claim 17, wherein the first pump includes a first pump impeller positioned within the flow duct in the reservoir of the solder pot and the second pump includes a second pump impeller positioned within the flow duct in the reservoir of the solder pot, the flow of solder material within each chamber of the two chambers being controlled by a respective pump impeller of the two pump impellers.

19. The wave soldering station of claim 18, wherein the first pump impeller and the first chamber are configured to deliver solder material to a load side of the solder distribution baffle, and the second pump impeller and the second chamber are configured to deliver solder material to an unload side of the solder distribution baffle.

20. The wave solder station of claim 19, wherein the operation of the first pump impeller and the movement of the exit wing to the lowered position provides a minimum contact length of the solder wave and the operation of the first pump impeller and the second pump impeller and the movement of the exit wing to the raised position provides a maximum contact length of the solder wave.

* * * * *